US010606342B2

(12) United States Patent
Henrique Barbosa Postal et al.

(10) Patent No.: US 10,606,342 B2
(45) Date of Patent: Mar. 31, 2020

(54) HANDSFREE USER INPUT METHOD FOR CONTROLLING AN IMMERSIVE VIRTUAL ENVIRONMENT APPLICATION

(71) Applicant: SAMSUNG ELECTRÔNICA DA AMAZÔNIA LTDA., Campinas (BR)

(72) Inventors: Antonio Henrique Barbosa Postal, Campinas (BR); Ederson Marcos Ferreira, Campinas (BR); William Massao Sawada, Campinas (BR)

(73) Assignee: SAMSUNG ELETRÔNICA DA AMAZÔNIA LTDA., Campinas-São Paulo (BR)

( * ) Notice: Subject to any disclaimer, the term of this patent is extended or adjusted under 35 U.S.C. 154(b) by 0 days.

(21) Appl. No.: 15/282,377

(22) Filed: Sep. 30, 2016

(65) Prior Publication Data

US 2017/0249021 A1    Aug. 31, 2017

(30) Foreign Application Priority Data

Feb. 26, 2016   (BR) .......................... 10 2016 004365

(51) Int. Cl.
*G06F 3/01*        (2006.01)
*G02B 27/01*    (2006.01)
(52) U.S. Cl.
CPC ............ *G06F 3/011* (2013.01); *G02B 27/017* (2013.01); *G06F 3/012* (2013.01)
(58) Field of Classification Search
None
See application file for complete search history.

(56) References Cited

U.S. PATENT DOCUMENTS

| 2011/0009241 | A1* | 1/2011 | Lane ................... | A63B 24/0087 482/8 |
| 2013/0090881 | A1* | 4/2013 | Janardhanan ........ | G01C 22/006 702/104 |
| 2014/0179490 | A1 | 6/2014 | Schmitz et al. | |
| 2014/0192087 | A1 | 6/2014 | Frost | |
| 2014/0240351 | A1* | 8/2014 | Scavezze ................ | G06F 3/011 345/633 |
| 2015/0348327 | A1* | 12/2015 | Zalewski .................. | G06F 3/01 345/419 |
| 2016/0005233 | A1* | 1/2016 | Fraccaroli .......... | G02B 27/0172 345/633 |

* cited by examiner

*Primary Examiner* — Stephen T. Reed

(57) ABSTRACT

A handsfree user input method controlling an immersive virtual environment application for a user with head-mounted device including: detecting input events generated by the user walking motion; determining if the movement type performed by the user is rotation or translation, and if the movement performed by the user is translation, then: determining an equivalent walking distance; calculating a virtual translation distance in the virtual environment notifying virtual translation distance to the virtual environment application; if the movement performed by the user is rotation, then: determining an actual rotation angle; calculating a virtual rotation angle in the virtual environment; notifying the virtual rotation angle to the virtual environment application; interpreting the virtual values by applying virtual environment; and updating the device head mounted display in accordance with virtual content.

8 Claims, 3 Drawing Sheets

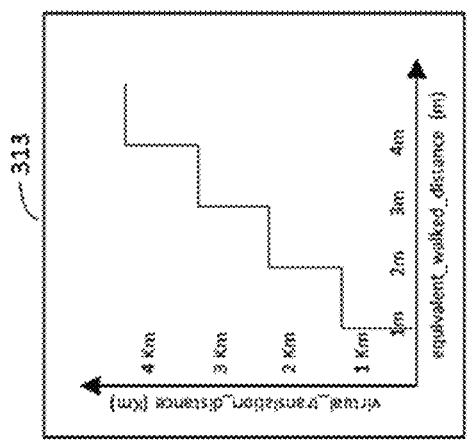
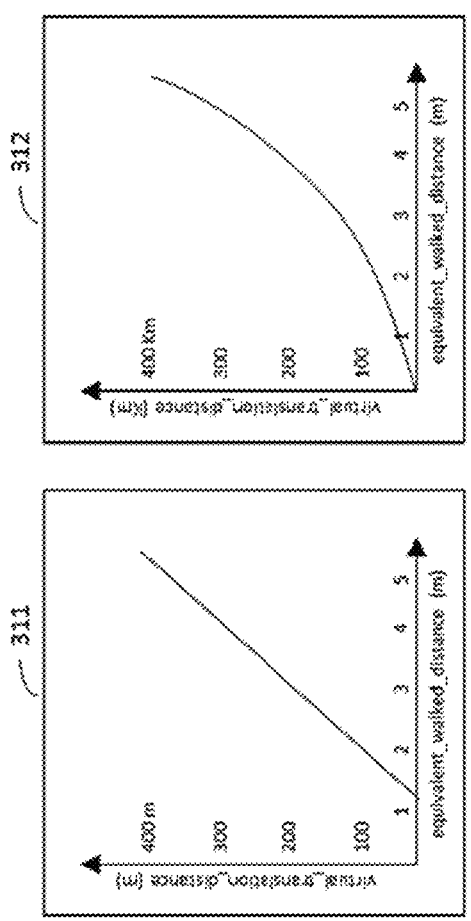
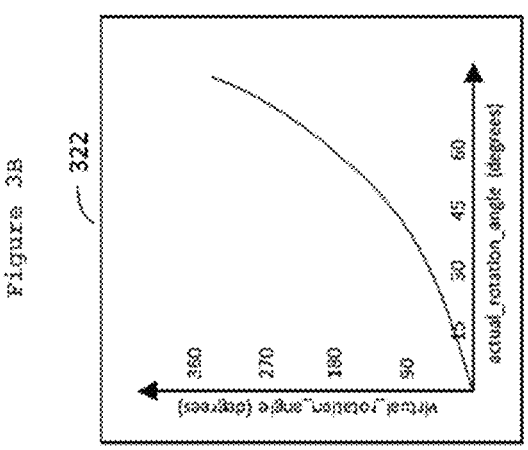
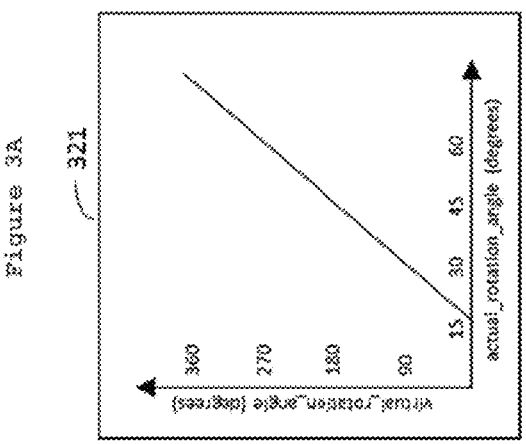
Figure 3A  Figure 3B  Figure 3C  Figure 3D  Figure 3E  Figure 3F

HANDSFREE USER INPUT METHOD FOR CONTROLLING AN IMMERSIVE VIRTUAL ENVIRONMENT APPLICATION

CROSS-REFERENCE TO RELATED APPLICATIONS

This application is a U.S. Utility Application, which claims the foreign priority benefit under 35 U.S.C. § 119 of Brazilian Patent Application No. 10 2016 004365 4, filed Feb. 26, 2016, the contents of which are incorporated herein by reference.

FIELD

The present invention refers to a handsfree user input method to an immersive virtual environment (VE) application based on stationary walking: simulated translation, rotation and jump motions, the calculation of virtual translation and rotation values based on VE-application-specific magnifying-reduction factors and/or functions and the interpretation of the calculated virtual values by the virtual environment application, for example, for controlling, moving or selecting user interface graphical objects, moving a representation of the user or the user view, among others.

BACKGROUND

Immersive virtual environments (VE), including virtual reality (VR) and augmented reality (AR), have actually became a reality as important companies such as Samsung, Google and Microsoft are developing new augmented reality and virtual reality products and applications. Many solutions are based on head-mounted display (HMD) devices containing a display, processing unit, mobile connectivity, sensors and user interfaces.

Some of these features can be integrated in regular smartphones or tablet devices (smartphone with a larger screen). For example, Samsung Gear VR, Oculus Rift and Google Cardboard solutions allow mobile phones to be attached to a head-mounted device.

Thought, virtual reality and augmented reality head-mounted display devices have some important limitations for the user to interact with the head-mounted device and control the immersive virtual environment applications. That is especially critical for head-mounted display devices which require a smartphone with touchscreen display which cannot be easily touched by the user while wearing it.

There are some input methods available for head-mounted display devices, such as gestures captures by a camera, infra-red beams and sensors, built-in touchpads, external mouse or pointer but in some cases, such as in virtual locomotion and navigation, they are not very natural or intuitive. In addition, most of these methods involve the use of hands or arms, which may be busy while user is working, practicing sports, operating equipment and tools or interacting with other person as in some augmented reality applications.

The paper "Redirecting Walking and Driving for Natural Navigation in Immersive Virtual Environments", from April, 2012, by Gerd Bruder et al., also describes techniques for using walking in confined spaces for navigating in immersive virtual environments. This paper differs from the present invention since its technique is based on "redirected walking", what means guiding users along paths in the real world that differ from the perceived path in the virtual world. For example, guiding the user wearing a head-mounted display along circular paths in a considerably smaller or curved tracked interaction space, while in virtual environment user feels like tracking a longer or straight path. The present invention uses a different approach than Gerd Bruder et al.'s work, wherein user can march in the same place while his steps are counted and the associated distance is reflected in the immersive environment, with the advantage of keeping the user in the, more natural, straight route, still requiring a minimum space available in stationary mode (user marches in the same place). Further, the present invention also includes rotation movements wherein the user turns his body or head around his body axis, detected by movement and direction sensors including a digital pedometer (step detector and step counter) implementation. The present invention also differs from the Gerd Bruder et al.'s paper since it is not limited to virtual navigation or transportation, but it presents input methods which may be applied to any graphical objects in the virtual environment, including pointers, cursors, input controls (buttons, checkboxes, spinners, pickers) and the user own representation.

The patent document WO 2014/073758, titled: "Forward-Moving Platform and Virtual Reality Walking System Using Same", filed on Apr. 19, 2013, by JOO JAE HOON, describes a forward-moving platform, such as a treadmill, which can move in virtual reality by actually moving forward, backward, to the left or to the right, and allows the user to always stay within a predetermined area even when moving in all directions for user safety. The present invention differs from document WO 2014/073758, since it uses user stationary walking movements such as translation and rotation as input methods for virtual environment, wherein both translation and rotation are calculated based on the equivalent walked distance based on the counted number of steps and the user turn angle detected by movement and direction sensors including a digital pedometer (step detector and step counter) implementation. In addition, the present invention is not limited to virtual navigation or transportation, but it presents input methods which may be applied to any graphical objects in the virtual environment, such as pointers, cursors, input controls (buttons, checkboxes, spinners, pickers) and the user own representation.

The patent document US 2014/192087 A1, titled "System and Method for Providing a Virtual Immersive Environment", filed on Jan. 9, 2014, by NORTHROP GRUMMAN SYSTEMS CORP, describes a virtual environment based on 360-degrees projection, differently than a head-mounted display, and it includes directional, audio, smoke, smell, clothes and floor vibration sensors. The user movements are limited to concentric circles and the projected immersive video responds to the user movements along the circles. The present invention is not limited to concentric circles to determine the displacement and it does not require 360-degrees projectors, but it is based on a head-mounted display device and uses user stationary walking movements such as translation and rotation as input methods for virtual environment, wherein both translation and rotation are calculated based on the equivalent walked distance based on the counted number of steps and the user turn angle detected by movement and direction sensors including a pedometer (step detector and step counter) implementation.

The patent document WO 2010/089618 A2 titled: "Walking Platform Especially for Virtual Reality (VR) Systems", filed on Feb. 5, 2010, by SZIGETLAKI ZSOLT, presents a walking platform preferably for virtual reality systems, comprising a locomotion surface providing support for the user's feet, whereas said locomotion surface is associated with rotatable members for promoting the motion of the user's feet. It is basically a stationary omni-directional treadmill or moving surface where the user walks in the same physical space while he interacts with virtual reality. The present invention also allows user to interact with virtual reality, but it differs from document WO 2010/089618 A2 since it does not require a walking platform or a treadmill for stationary walking; rather than that the present invention takes advantage of a head-mounted display device and stationary user walking movements: the present invention proposes user actually walks or march in the same place, while the distance equivalent to the counted number of steps is used as the translation input, and the user's body or head turn is used as the rotation input, for the purpose of interacting with graphics objects in the Virtual Environment. In addition, the present invention application is not limited to virtual navigation or transportation, but it presents input methods which may be applied to any graphical objects in the virtual environment, including pointers, cursors, input controls and user own representations.

The patent document US 2014/179490 A1 titled: "Method of Controlling a Device Allowing a User to Walk or Run on the Spot In an Arbitrary Direction and Device Therefore", filed on May 9, 2012, by MSE OMNIFINITY AB, presents a stationary central platform (9) surrounded by a convex polygon shaped deck (6) in level therewith, said deck (6) being divided into trapezoid shaped roller conveyors. It is basically another stationary Omni-directional treadmill based on rolling conveyors where the user walks in the same physical space while he interacts with virtual reality. The present invention also allows user to interact with virtual reality, but it differs from document US 2014/179490 since it does not require a treadmill; rather than that the present invention takes advantage of a head-mounted display device and stationary user walking movements: user can walk in the same place while his translation and rotation are inputs interpreted in the virtual environment according to its specific scope and context. In addition, the present invention is not limited to virtual navigation or transportation, but it presents input methods which can be applied to any graphical object in the virtual environment or user representations.

The patent document KR20140089647 titled: "Virtual Reality Walking Platform System and Method Using an OMNI-Directional Floor", filed on Jan. 3, 2013, by DODAAM SYSTEMS LTD, presents a virtual reality walking method using an Omni-directional floor, through which a position, a distance, a working speed, and an acceleration of a user can be acquired if the user walks on an Omni-directional floor while watching a virtual reality world through an image unit. The present invention also allows user to interact with virtual reality, but it differs from document KR 20140089647 since it does not require a treadmill or moving floor; rather than that the present invention takes advantage of a head-mounted display device and user with stationary walking movements may just walk in the same place while his translation and rotation are inputs interpreted in the virtual environment according to its specific scope and context. In addition, the present invention is not limited to virtual navigation or transportation, but it presents input methods which may be applied to any graphical objects in the virtual environment, such as pointers, cursors, input controls or user representations.

The method of the present invention resembles and simulates the most natural method of navigation for humans, the walking, for controlling graphical objects in virtual environment application: depending on the correspondent translation distance walked by the user and/or the rotation angle turned by the user, a immersive virtual environment application running head-mounted display device's will interpret these inputs according to its own scope and context, and it will respond by updating the virtual content presented by the head-mounted display to the user, by:
 moving cursor, pointer or graphic objects in the virtual reality application,
 moving an object inside the virtual reality application, including an object which represents the user,
 user self-motion: moving the user view (the user's point of view), or the user's perspective inside the virtual reality/augmented reality application,
 defining the navigation path of the user in the immersive media,
 interacting with a graphical interface object, changing its value or status, not limited to these.

Other alternative algorithms and methods for movement detection could be designed, but the preferred embodiment of the present invention takes advantage specifically of the "walking" paradigm, since it is a natural form of transportation and navigation, by resembling it and simulating it, while providing analogous inputs to control a virtual environment.

SUMMARY

The present invention is related to immersive virtual environments (VE), virtual reality (VR), augmented reality (AR) and user interface (UI) fields.

The present invention proposes an handsfree user input method for the user to interact in virtual environments while wearing a head-mounted display device, which may contain a smart mobile phone or a tablet device executing a virtual environment application.

When using a head-mounted display device in an immersive virtual environment, either a virtual reality or augmented reality application, the user may prefer standing, walking and/or keeping his hands free. For example, some virtual reality applications involving virtual displacement or navigation can look more natural if user stands-up and walks; while an augmented reality user may prefer keeping his hands free while performing real-world activities while seeing-through the head-mounted display, for example, using his hands for interacting with people or objects or using tools.

Since user cannot always directly see the real-world images through the head-mounted display device and frequently user is in a constrained space while wearing a head-mounted display, such as in a room, the present invention proposes a safer and more convenient approach based on stationary movements, in which the user walks or marches on the same physical place.

The approach is mainly based on the interpretation of the following stationary user walking motions:
 the translation, when the user walks in the same place and his steps are detected and counted, by implementing a digital pedometer (step detector and step counter) based on movement sensors, and an equivalent walking distance is calculated.
 the rotation, when user turns his body or head around the vertical axis of his body or head and the rotating angle is detected by using direction sensors.

For both cases a magnifying and/or reduction multiplication factor or a conversion function, which may be linear, non-linear or discrete can be applied to the translation distance or the rotation angle according to the virtual environment application. For example, depending on the IE application the user may travel a kilometer or a micrometer which can be represented by one step.

Besides rotation and translation, a jump event also can be differentiated from the previous motions and it can be mapped to a selection input event (similar to a mouse click event).

The virtual environment application can interpret the user rotation, translation and jump as user interface (UI) control inputs by changing its appearance, behavior and workflow, for example, by interacting with a graphical interface object, controlling a cursor or changing its input value or status. As a result, the head mounted display will present an updated virtual content to the user as a response of his input walking action.

The above described objectives are achieved through a method for controlling the displaying of an immersive virtual environment application to a head-mounted display user based on a walking paradigm comprising:

detecting input events generated by the walking motion of the user by means of sensors;
  determining if the motion type effected by the user is translation or rotation; and
  if the motion effected by the user is translation, then:
    determining an equivalent walking distance considering the average user step length;
    calculating a virtual translation distance in the virtual environment by applying a translation factor and/or translation function provided by the specific virtual environment;
    notifying the virtual translation distance to the virtual environment application;
  otherwise, i.e., if the motion effected by the user is rotation, then:
    determining an actual rotation angle;
    calculating an virtual rotation angle in the virtual environment by applying a rotation factor and/or a magnifying or reduction rotation function provided by the virtual environment application;
    notifying virtual rotation angle for virtual environment application;
  interpreting virtual values by the virtual environment application;
  updating the display of the head-mounted display in accordance with said virtual content.

Sensors include accelerometer, gyroscope, magnetometer, compass and other movement and direction sensors built in the head-mounted display device or in the mobile device attached thereto, as well as a digital pedometer module which can integrate some of those sensors and steps detection and counting firmware, for lower power consumption and reduced size.

For example, the Android mobile operating system platform from version V4.4 (KitKat) supports two new composite sensors—step detector and step counter—that let your applications track steps when the user is walking, running, or climbing stairs. These new sensors are integrated in hardware for low power consumption. A device already supporting this sensor is the Nexus 5. Some smartphones have a built-in pedometer that uses a software to display your daily step counts. One implementation may include an inertial measurement unit consisting of an accelerometer, MEMS (Microelectromechanical Systems) gyroscope and compass. An example of pedometer algorithm is described in the article "Full-Featured Pedometer Design Realized with 3-Axis Digital Accelerometer", by Neil Zhao.

BRIEF DESCRIPTION OF DRAWINGS

The objectives and advantages of the present invention will become more clear through the detailed description below of an example but not limitative embodiment of the attached figures, in which:

FIG. 3A is a graph showing an example of linear translation function according to one embodiment of the present invention.

FIG. 3B is a graph showing an example of non-linear translation function according to one embodiment of the present invention.

FIG. 3C is a graph showing an example of translation function with discrete increments of virtual translation values according to one embodiment of the present invention.

FIG. 3D is a graph showing an example of linear rotation function according to one embodiment of the present invention.

FIG. 3E is a graph showing an example of non-linear rotation function according to one embodiment of the present invention.

FIG. 3F is a graph showing an example of rotation function with discrete increments of virtual rotation values according to one embodiment of the present invention.

DESCRIPTION OF EMBODIMENTS

According to embodiments, the present invention proposes a new, natural and convenient handsfree input method to interact with a virtual reality or an augmented reality head-mounted display device based on user stationary walking. The head-mounted display device may contain a mobile phone or tablet device therein.

Figure 1:
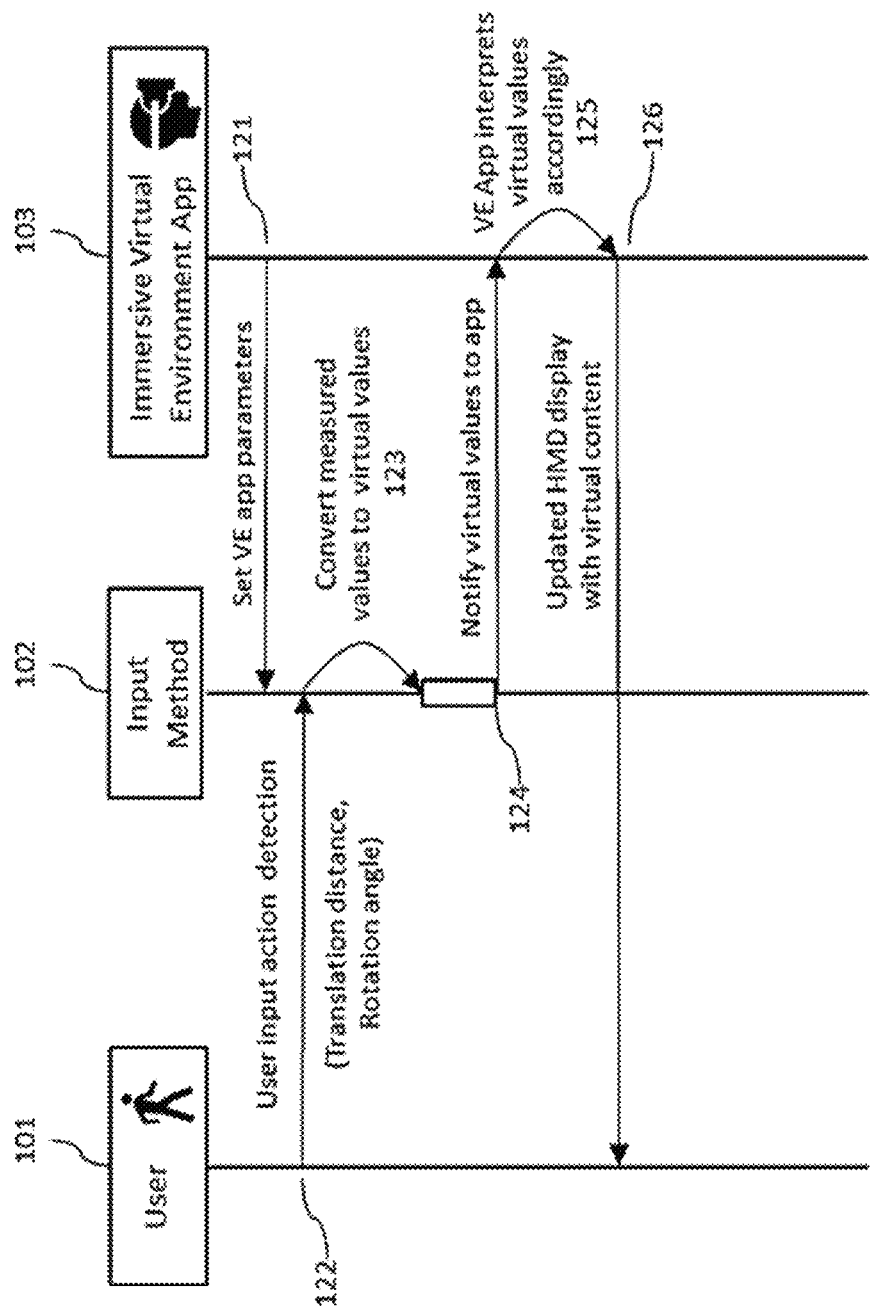
FIG. 1 shows a sequential diagram of the user's interaction with the method according to one embodiment of the present invention.

FIG. 1 depicts how a user 101 interacts with the virtual environment application 103 through the input methods based on user stationary walking 102.

Initially the virtual environment application, depending on its specific scope and context, will set the input methods with specific virtual environment parameters for that application 121, including the translation factor, translation function, rotation factor and rotation function.

Upon a user input action 122 being detected by the device sensor, the input method can recognize it as an equivalent walking distance translation and/or a rotation event and it can convert these motions to virtual values according to predefined translation and/or rotation factors and functions 123. The virtual environment application is notified about the converted virtual values 124 and it interprets them accordingly 125.

As a result, the head-mounted display of the device is updated with virtual content 126 reflecting the interpretation of those virtual environment values and the updated virtual content which will be presented to the user. For virtual reality applications, the immersive virtual environment is updated reflecting the original user input action based on user walking 122. For augmented reality applications, the updated virtual image is superposed with the real-world image.

Figure 2:
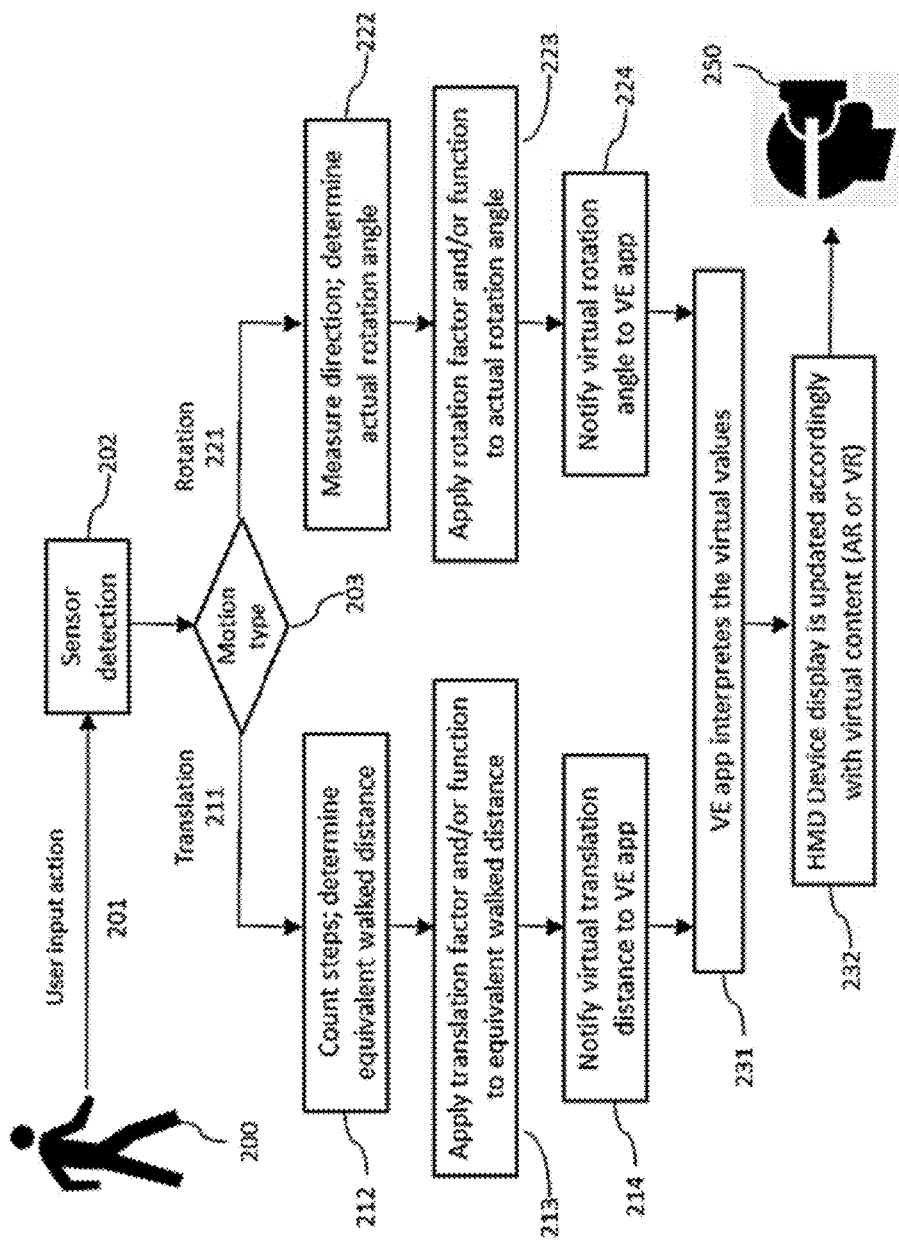
FIG. 2 shows a flow of input methods according to one embodiment of the present invention.

FIG. 2 shows a flowchart detaining the process performed by the input method 102.

Upon sensor detection 202 of a user walking action 201, the input method can recognize the motion types 203, a translation and/or a rotation:

A virtual translation 211 distance is defined by detecting and counting the user steps, an equivalent walked distance (in meters, feet/inches, etc.) 212 is estimated according to the average user step length, as per digital pedometer of the prior-art, and a virtual translation distance in the immersive virtual environment 213 is calculated by applying a translation factor and/or a translation function given by the specific virtual environment application:

virtual translation distance=equivalent walked distance*translation factor, or virtual translation distance=translation function (equivalent walked distance).

For example, depending on the virtual environment application the user may anticipate increments of one kilometer in the virtual environment application per step or equivalent meter, by applying a translation function 313. Instead, the user may advance in the virtual environment application a virtual distance which is linearly 1000 or 0.001 times the equivalent walked distance based on the number of user steps, by applying a translation factor.

As shown in FIGS. 3A-3C, the translation function may be linear 311, non-linear 312 or even describe discrete increments of virtual translation values 313.

The steps counter may be implemented using built-in head-mounted display device sensors, such as the accelerometer and gyroscope, as in digital pedometer device. The steps are counted from a stationary user walking, while user marches in the same place. Stationary approach is a very convenient and safe approach for constrained spaces or when user is using a head-mounted display device and cannot see-through directly the real-world image. The invention is not limited to stationary user walking and it must behave equally in case user actually moves in the space around.

A rotation 221 angle is provided by head-mounted display from mobile device directions and movement sensors measurements 222, an actual rotation angle (in degrees, radians, grads, etc.) is measured and a virtual rotation angle in the immersive virtual environment 213 is calculated by applying a rotation factor conversion or a rotation function given by the specific virtual environment application:

virtual rotation angle=actual rotation angle*rotation factor, or virtual rotation angle=rotation function (actual rotation angle).

For example, depending on the immersive environment application user may be able to turn increments of 90 degrees to the left or to right just with slight movements of head to the left or to the right (example 323) by applying a rotation function.

As shown in FIGS. 3D-3F, the rotation function may be linear 321, non-linear 322 or even describe discrete increments of virtual rotation values 323.

The actual rotation angle is measured using a direction sensor or a combination of direction sensors such as gyroscope, magnetometer, accelerometer and/or compass, which can measure the angle variation when user turns his body or head to the left or to the right around the vertical axis of his body or head.

According to the calculated virtual values for translation displacement 214 and rotation angle 224 after applying the respective factors, the virtual environment application can interpret those virtual values 231 according to its own context.

Following there are some examples of virtual environment applications and their interpretations of the input method are described:

For an architecture or engineering application, where the user is virtually visiting a real-state property, every stationary step may be converted to an advance of 100 meters in the real world 311, and slight movements of head to the left or to the right are translated into 90 degrees turns to the left or right inside the home 323.

For a location or astronomy application where the user is virtually navigating around the globe or traveling in the space, each step shall be converted into kilometers or light-years 312.

For a Chemistry or Biology application where user is virtually navigating in the atomic-molecular space or inside a human body, each step shall be a subunit of meter.

For a generic user interface application where user is virtually selecting options in a virtual option menu (e.g. spinner, drop-down or picker user interface), each step shall be used to move a subsequent option in the menu (analogous to a mouse wheel rotation).

For a Genetic Engineering application where user is visually rotating more than 360 degrees, such as in a DNA helix or tracking a screw structure, every few degrees rotated by the user or by the user's head may be converted into a quarter-turn (a 90 degrees turn) 323.

According to the interpretation of the virtual environment application, the head-mounted display of the device will be updated with updated virtual content 232, which will be displayed to the user 250 as a response of the original user input based on stationary walking methods 200.

Some embodiments of the present invention, especially for virtual reality (VR) applications which does not allow user to directly see the real world image (as in augmented reality) can include methods to prevent collisions or obstacles during the stationary walking movement while using a head-mounted display (HMD). Collision-detection methods may include one of the following techniques, or a combination of them:

Indoor or outdoor location geo-fences, using GPS or indoor location sensors which notifies the user when it crosses predefined boundaries.

Camera image processing: a camera attached to the head-mounted display or an external camera conveniently positioned in the environment can observe user and notifying him when boundaries are crossed or obstacles are close to the user.

Beacons emitted from environment and detected by the device sensors: reference emitters (sound, light, RF-Bluetooth, etc.) are positioned in environment limits or close to obstacles, and those signals are detected by HMD device sensors.

Although the present invention has been described in connection with certain embodiments, it should be understood that it is not intended to limit the invention to that particular embodiment. Rather, it is intended to cover all alternatives, modifications and equivalents possible within the spirit and scope of the invention as defined by the appended claims.

The invention claimed is:

1. A method comprising:

detecting, by at least one sensor, a walking motion of a user corresponding to a walking-in-place motion while the user remains in a stationary position;

determining whether the detected walking motion is a rotation or a translation, and based on the determining whether the detected walking motion is a rotation or a translation, providing a calculated virtual translation distance or a calculated virtual rotation angle to a virtual environment application on a head-mounted display to update the virtual environment application;

wherein:

when the detected walking motion is determined to be a translation, the providing includes:
  determining an actual translation distance of the detected walking motion based on a length of an average user step;
  calculating the virtual translation distance in the virtual environment application by applying a translation function provided by the virtual environment application to the determined actual translation distance and calculating the virtual translation distance by detecting and counting the user step, wherein an equivalent walked distance is estimated according to the length of the average user step; and
  providing the calculated virtual translation distance to the virtual environment application; and when the detected walking motion is determined to be a rotation, the providing includes:
  determining an actual rotation angle of the detected walking motion;
  calculating the virtual rotation angle in the virtual environment application by applying a rotation function provided by the virtual environment application to the determined actual rotation angle; and
  providing the calculated virtual rotation angle to the virtual environment application.

2. The method of claim 1, wherein at least one of the translation function and the rotation function is at least one of a linear, non-linear, and discrete function.

3. The method of claim 1, further comprising detecting, by the at least one sensor, a jumping motion of the user, and providing the detected jumping motion as a selection event signal to the virtual environment application.

4. The method of claim 1, wherein the head-mounted display includes mobile connectivity and a user interface, and the at least one sensor includes a digital pedometer.

5. The method of claim 1, wherein the method is performed by at least one of a smartphone and a tablet coupled to the head-mounted display.

6. The method of claim 1, wherein the virtual environment application superimposes real-world images captured by a camera with a processed virtual image based on at least one of the provided calculated virtual translation distance and the provided calculated virtual rotation angle.

7. A non-transitory computer-readable recording medium storing a program to implement a method comprising:
  detecting, by at least one sensor, a walking motion of a user corresponding to a walking-in-place motion while the user remains in a stationary position;
  determining whether the detected walking motion is a rotation or a translation, and
  based on the determining whether the detected walking motion is a rotation or a translation, providing a calculated virtual translation distance or a calculated virtual rotation angle to a virtual environment application on a head-mounted display to update the virtual environment application;

wherein:

when the detected walking motion is determined to be a translation, the providing includes:
  determining an actual translation distance of the detected walking motion based on a length of an average user step;
  calculating the virtual translation distance in the virtual environment application by applying a translation function provided by the virtual environment application to the determined actual translation distance and calculating the virtual translation distance by detecting and counting the user step, wherein an equivalent walked distance is estimated according to the length of the average user step; and
  providing the calculated virtual translation distance to the virtual environment application; and when the detected walking motion is determined to be a rotation, the providing includes:
  determining an actual rotation angle of the detected walking motion;
  calculating the virtual rotation angle in the virtual environment application by applying a rotation function provided by the virtual environment application to the determined actual rotation angle; and
  providing the calculated virtual rotation angle to the virtual environment application.

8. An apparatus comprising:
at least one memory configured to store instructions; and
at least one processor configured to execute the stored instructions to implement a method comprising:
detecting, by at least one sensor, a walking motion of a user corresponding to a walking-in-place motion while the user remains in a stationary position;
determining whether the detected walking motion is a rotation or a translation, and
based on the determining whether the detected walking motion is a rotation or a translation, providing a calculated virtual translation distance or a calculated virtual rotation angle to a virtual environment application on a head-mounted display to update the virtual environment application;

wherein:

when the detected walking motion is determined to be a translation, the providing includes:
  determining an actual translation distance of the detected walking motion based on a length of an average user step;
  calculating the virtual translation distance in the virtual environment application by applying a translation function provided by the virtual environment application to the determined actual translation distance and calculating the virtual translation distance by detecting and counting the user step, wherein an equivalent walked distance is estimated according to the length of the average user step; and
  providing the calculated virtual translation distance to the virtual environment application; and when the detected walking motion is determined to be a rotation, the providing includes:
  determining an actual rotation angle of the detected walking motion;
  calculating the virtual rotation angle in the virtual environment application by applying a rotation function provided by the virtual environment application to the determined actual rotation angle; and
  providing the calculated virtual rotation angle to the virtual environment application.

* * * * *

UNITED STATES PATENT AND TRADEMARK OFFICE
CERTIFICATE OF CORRECTION

PATENT NO. : 10,606,342 B2
APPLICATION NO. : 15/282377
DATED : March 31, 2020
INVENTOR(S) : Antonio Henrique Barbosa Postal et al.

It is certified that error appears in the above-identified patent and that said Letters Patent is hereby corrected as shown below:

On the Title Page

Item (71) (Applicant), Line 1:
Delete "ELECTRÔNICA" and insert -- ELETRÔNICA --, therefor.

Signed and Sealed this
Twenty-first Day of July, 2020

Andrei Iancu
*Director of the United States Patent and Trademark Office*